Aug. 4, 1964
W. TRAUTNER ETAL
3,143,301
LAMP ASSEMBLY WITH RESILIENT MOUNTING FOR WEDGE BASE BULBS
Filed Oct. 5, 1961
2 Sheets-Sheet 1
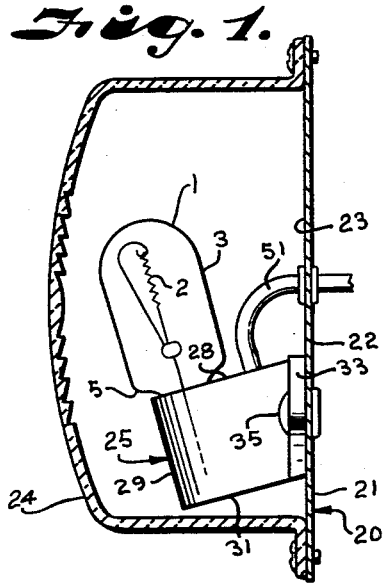
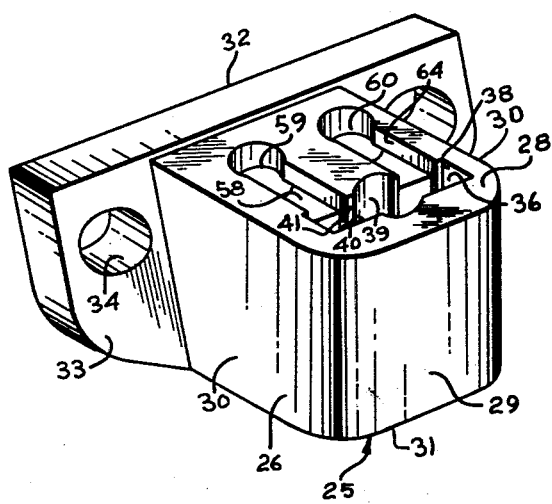
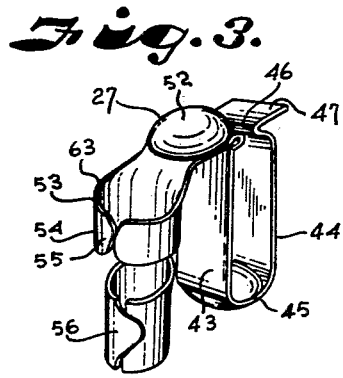
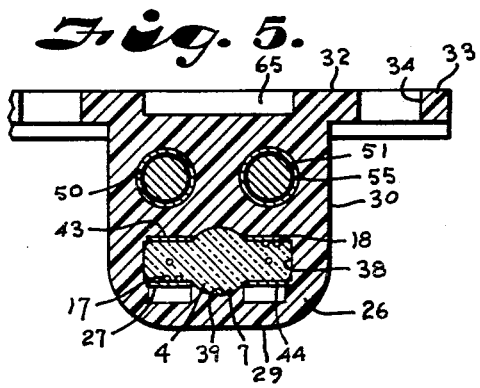
INVENTOR.
WAGN TRAUTNER &
BY DON R. ARMACOST
Fishburn and Gold
ATTORNEYS

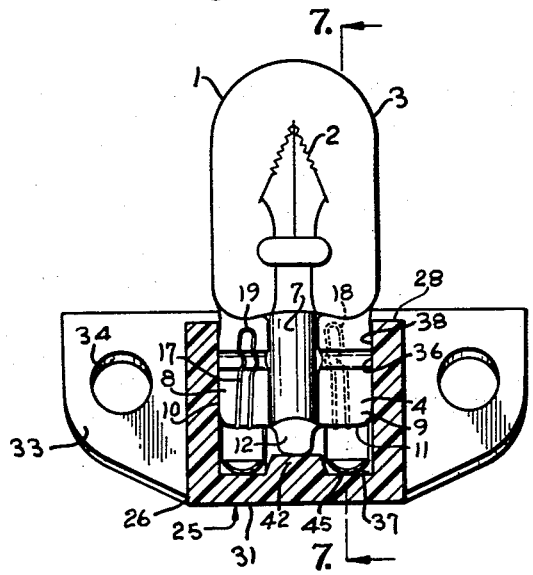
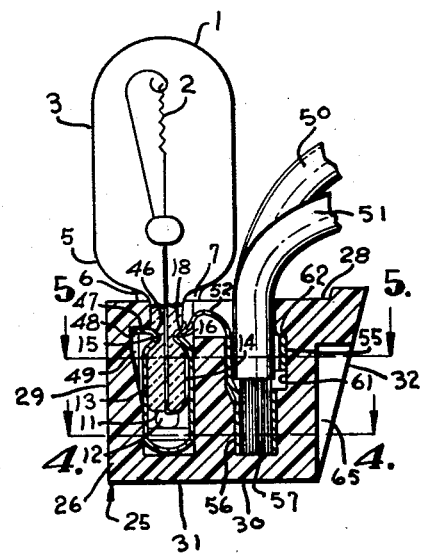
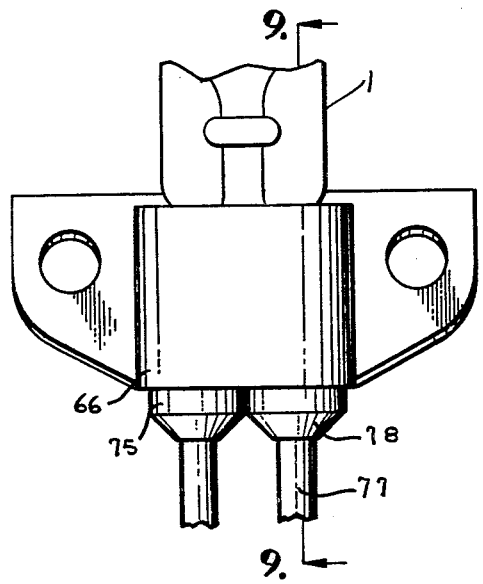
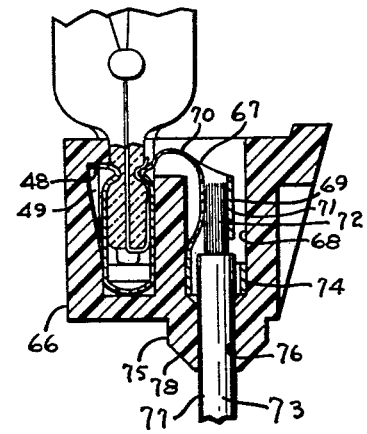

United States Patent Office 3,143,301
Patented Aug. 4, 1964

3,143,301
LAMP ASSEMBLY WITH RESILIENT MOUNTING
FOR WEDGE BASE BULBS
Wagn Trautner, Overland Park, and Don R. Armacost, Mission Hills, Kans., assignors to Peterson Manufacturing Company, Kansas City, Mo., a corporation of Missouri
Filed Oct. 5, 1961, Ser. No. 143,111
8 Claims. (Cl. 240—90)

This invention relates to light mountings, such as vehicle, marker and signal lights, and more particularly to shock absorbing bulb mountings therefor.

In the operation of vehicles, particularly heavy duty equipment such as trucks and the like, portions are subjected to various vibrations and shocks due to unevenness of road surfaces and the like, and such shocks adversely affects the lights and bulbs thereof, resulting in damage and failure. Also, use of higher voltages and filament wires of smaller cross section makes the bulbs more likely to fracture and fail due to shock, impact and vibration, resulting in necessity of frequent replacement and also danger or hazards in operation of the vehicle between the bulb failure and replacement because of insufficient or improper marking. Attempts have been made to overcome the problem of lamp vibration by the use of rubber as a cushion between the support and a lamp and, while the resiliency of the rubber naturally absorbs some of the vibrations, it can also result in increase in the extent of movement of the bulb whereby reversals of such movement still provide substantial shock to the bulb and filament.

The principal objects of the present invention are to provide a lamp assembly and light bulb mounting adapted to resist vibrational stresses and absorb impact and shock whereby the bulbs have extended durability; to provide an electric contact retaining body of resilient material wherein the contacts are of resilient metal and the engagement of body portions and the resilient contacts with the bulb base provides substantial support with a minimum of relative movement; to provide such an electric socket or receptacle with a minimum number of parts and cooperating engaging portions to retain the parts in the assembly; to provide such a structure with the bulb and mounting portions so related as to require a minimum of outward projection of a lamp from a support and with no interruption of the light emission outwardly from a plane through the center of the filament and parallel to the mounting surface; and to provide a shock absorbing mounting for bulbs wherein the body is moldable in one piece and electrical contacts are removably inserted therein and maintained in position without auxiliary fastening devices or special tools; to provide such a shock absorbing bulb mounting that is economical to manufacture, easily assembled and efficient in operation to reduce failure of bulbs resulting from shock, impact and vibration.

Other objects and advantages of this invention will become apparent from the following description taken in connection with the accompanying drawings wherein are set forth by way of illustration and example certain embodiment of this invention.

FIG. 1 is a sectional view through a light structure illustrating a bulb and mounting therein.

FIG. 2 is a perspective view of the socket body.

FIG. 3 is a perspective view of an electrical contact.

FIG. 4 is a sectional view through the bulb mounting structure taken on the line 4—4, FIG. 7.

FIG. 5 is a sectional view through the bulb mounting structure taken on the line 5—5, FIG. 7.

FIG. 6 is a sectional view through the bulb base receiving socket with a bulb shown in elevation therein.

FIG. 7 is a sectional view through the bulb and mounting taken on the line 7—7, FIG. 6.

FIG. 8 is an elevational view of a modified form of mounting.

FIG. 9 is a sectional view through the modified mounting taken on the line 9—9, FIG. 8.

Referring more in detail to the drawings:

This invention particularly contemplates the shock absorbing mounting and support of light bulbs known as "wedge base" bulbs 1 wherein the filament 2 is in a transparent envelope 3 formed of glass or the like with the material of the envelope molded to form a base 4 at one end thereof. Opposite sides of the envelope adjacent the base are curved inwardly as at 5 and then curved as at 6 to merge with side surfaces of the base, said base being substantially solid and having a generally cylindrical shaft or stem 7 substantially axial of the bulb with oppositely extending wings 8 and 9 integral with said stem or shaft terminating in opposed substantially parallel end faces 10 and bottom faces 11. The stem 7 has a reduced bottom end 12 extending below the bottom faces 11 of the wings, as illustrated in FIG. 6. The wings 8 and 9 each have opposed substantially parallel side faces 13 and 14 each having opposed depressed grooves 15 and 16 extending laterally outwardly from the stem substantially perpendicular relative to the axis thereof. The terminals 17 and 18 from the filament extend through the base 4 in spaced relation and out the bottom faces 11 of the wings and are then turned upwardly to lie in engagement with a respective wing side face and, in the respective groove therein, terminating as at 19 above said groove. One of the terminals extends outwardly and upwardly along the face 13 of one wing 8 and the other terminal extends outwardly and upwardly on the face 14 of the other wing 9 at the opposite side whereby the bulb is reversible and still presents the terminals in the same orientation.

The lamp assembly 20 shown is exemplary only and includes a housing 21 having a wall or support portion 22 preferably having a flat surface 23 and a lens 24 suitably mounted thereon. A bulb 1 is supported in the lamp housing 21 by a shock absorbing mounting structure 25 in the form of a socket receptacle having a body 26 with spaced electrical contact members 27 therein whereby the body and contacts receive the bulb base 4 to support the bulb. The body 26 is preferably made of non-conducting resilient material and is elastic throughout as, for example, said body may be molded of rubber or suitable yieldable synthetic resin such as polyethylene, polyvinylchloride or other known yieldable plastics capable of deforming under stress and capable of automatic restoration to original form. In the structure illustrated, the body 26 has a substantially flat top face 28, a forward face 29, side faces 30, a bottom face 31 and a rear face 32. The body is preferably adapted to be mounted on a suitable support and, in the illustrated structure, has laterally extending flanges 33 adjacent the rear of the body with apertures 34 in said flanges for suitable fastening devices 35 such as rivets or the like for mounting on a support as a wall 22 with the flanges providing yielding sections between the fastening members and the body member 26. In the structure illustrated, the bulb 1 is arranged whereby the envelope portion 3 is above the upper surface 28 with the axis of the bulb substantially at right angles thereto and the rear surface 32 of the body and flanges 33 is at an acute angle to the axis of the bulb whereby when mounted on a vertical surface the envelope of the bulb is inclined upwardly and outwardly relative to said supporting surface, as illustrated in FIG. 1.

The body 26 is provided with a cavity 36 extending therein substantially at right angles to the upper surface 28, said cavity opening at the upper surface and terminating in a bottom 37 in spaced relation to the bottom face 31. The upper portion of the cavity adjacent the surface 28 substantially corresponds to the shape of the cross section of the base 4 of a wedge base bulb and is slightly smaller with the wing-receiving portions extending laterally and terminating in end faces 38 spaced from the side faces 30 of the body. The relative size of the upper portion of the cavity is such that the end faces 38 resiliently engage the end faces 10 of the wings 8 and 9 of the bulb base 4 and portions 39 of the body define a generally cylindrical portion of the cavity and engage the surfaces of the stem 7. The cavity is also defined by opposed faces 40 and 41 which engage the opposed faces 13 and 14 of the wings of the bulb base 4. The side faces 40 and 41 and end faces 38 of the cavity extend to the bottom 37 thereof and said end faces 38 have resilient engagement with the full height of the end faces 10 of the bulb base wings 8 and 9 when the base is inserted therein, and said central portion 39 has resilient engagement for the full height of the stem in said body. The bulb when positioned in the cavity is retained, as later described, with the curved portions 6 of the envelope 3 resiliently engaged by and slightly compressing the portions of the body defining the upper opening of the cavity and the projecting portion 12 of the stem 7 compresses a projection or portion 42 extending upwardly in the cavity 36 from the center of the bottom 37, as illustrated in FIG. 6, said portion 42 being disposed under and in alignment with the cylindrical stem receiving portion of the cavity.

Electrical contact members 27 are arranged in the body and preferably have generally U-shaped portions positioned in the cavity 36 in spaced relation to the center portion 39, there being one contact member 27 on each side of said center portion. The contact members 27 preferably have spaced legs 43 and 44 connected at their lower portions by a bar or bight 45 which, in the illustrated structure, is preferably formed with a downward curvature such as a spherical contour to provide rigidity. The legs 43 and 44 preferably have a spacing substantially corresponding to the thickness of the wings 8 and 9 and said legs are of narrower width than the spacing between the central portion or stem 7 and the end faces 10 of the wings and said legs are recessed in the faces 40 and 41 of the body whereby said legs will engage the opposed faces 13 and 14 of the bulb wings and the faces 40 and 41 of the body on each side of the legs 43 and 44 will also engage the faces 13 and 14 of the bulb base 4 to resiliently support same when in the cavity or socket 36. Each of the legs 43 and 44 have ribs or inwardly extending portions 46 adjacent their upper ends and adapted to engage in the grooves 15 and 16 of the bulb base wings to retain the bulb base in the socket 36. Also, one leg of each contact 27 engages a terminal wire of the bulb.

In the illustrated structure, the contacts are removable from the body and the upper end of the leg 44 is turned outwardly to form a flange 47 adapted to engage under a shoulder 48 spaced from the upper surface 28 and formed by an enlargement of the cavity toward the forward face 29 and for the width of the respective contact as at 49 the distance between the shoulder 48 and the bottom 37 of the cavity or socket 36 substantially corresponding to the distance from the upper face of the flange 47 to the bottom of the concave bar 45 whereby the contact is held against movement in the cavity in a vertical direction. A suitable ground, as by a conductor 50, is connected to one of the contacts 27, and another conductor 51 is suitably connected to the other contact and with an electric circuit to supply energy to a bulb placed in the socket.

In the illustrated structure, the contact members each have a spherical bar or bight portion 52 at the upper end of the leg 43 connecting with a wire connector 53 which extends downwardly in spaced relation to the leg 43 and substantially parallel thereto in the form of an arm 54 with fingers 55 extending from opposite sides thereof adjacent the upper portion and fingers 56 extending from opposite sides of the arm adjacent the lower portion, said fingers being curved to form a generally cylindrical shape with the lower fingers 56 being bendable and in overlapping relation to tighten same around a conductor wire end 57. The body 26 has spaced substantially parallel grooves 58 extending generally rearwardly from the cavity or socket 36, said grooves 58 opening from the upper surface 28 and each having communication with a respective bore or cavity 59 and 60 extending into the body in substantially parallel relation to the cavity 35 to receive the wire connector 53 of the contacts 27. The cavities or bores 59 and 60 are laterally spaced and each have a counterbore or enlarged portion 61 spaced from the upper surface 28 and forming a shoulder 62 adapted to engage the upper edges 63 of the fingers 55 of the respective contact to aid in holding the contacts in the body. The lower portion of the bores 59 and 60 preferably corresponds to the size and shape of the wire engaging portions of the arm 54 and the fingers 56. The sides 64 of the grooves 58 engage the respective bar portions 52 to cooperate with the other portions of the body cavities engaging the contacts and wire connectors to hold same against relative movement other than through resiliency of the body. The contacts and wire connectors are removably mounted in the body and are preferably formed of resilient metal such as brass. The body also is preferably molded with a cavity 65 in the rear portion thereof, as illustrated in FIGS. 5 and 7, for reduction in the walls or sections and increased resiliency between the flanges 33 and the body.

In installing a socket receptacle with contacts retained therein, as illustrated and described, bared wire end portions 57 of insulated conductors 50 and 51 are arranged in the respective wire connectors 53 of the two contacts 27, and the fingers 56 tightened thereagainst. The contacts are then arranged over the cavities with the wire connection portion over the respective cavities 59 and 60 and the U-shaped portions on the respective sides of the center portion 39 of the cavity 36, and then moved downwardly therein with the legs 43 and 44 compressed toward each other whereby the flange 47 will pass through the narrowed portion of the upper end of the cavitiy 36 and enter under the shoulder 48. At the same time, the edge 63 will enter under the respective shoulder 62 and the bar portion 52 will enter the groove 58 to positively position the contacts in the respective portions of the cavities. The receptacle socket may then be installed in a light or other suitable place of use by suitable fastening devices 35 whereby the face 32 is engaged with the face 23 of a support 22. The ground wire 50 may be suitably connected to a ground of the electric circuit and, if the support is grounded, it may be connected to one of the fastening devices 35. In installing a wedge base bulb in the socket, the bulb 1 is arranged over the cavity 36 with the wedge base 4 in alignment therewith and is then moved downwardly, spreading the legs 43 and 44 of the respective contacts until the grooves 15 and 16 are engaged by the ribs 46. The legs 43 and 44 both have ribs 46 thereon so that they engage the terminal wires of the bulb in the grooves 15 and 16 regardless of the positioning of the bulb therein, and furthermore the arrangement of the grooves 15 and 16 relative to the curved portions 6 of the envelope and the extension 12 of the stem retains the curved portions 6 engaged with the upper part of the body on opposite sides of the upper portion of the cavity 36 to compress the material of the body and also the extension 12 is compressed into the portion 42 and the resilient material of the body engages the end edges of the wings 8 and 9 and the side faces 13 and 14 on both sides of the legs 43 and 44, and said legs engage the side faces of the wings to maintain substantially embracing of the bulb base in such a manner that one side of each wing is engaged along the entire surface from the groove to the bottom of the wing, and the other side is engaged by the rib or bead and the terminal wires of the bulb and other portions of the base engaged by the resilient material of the body defining the cavity 36 to maintain a tight grip on the bulb base and positively position same. The cylindrical portions of the cavity engaging the stem 7 of the bulb base 4 maintains a resiliency in the grip that is highly absorptive of any shock, impact and vibration, cooperating with the engagement of the faces 38 with the end faces 10 of the wings and the compressive engagement of the lower portion of the envelope and the extension 12 with the portions of the body to hold the bulb in complete isolation from shock, impact or vibration to which the body might be subjected.

The socket receptacle including the contacts is preferably formed of only three pieces for simplicity of manufacture and assembly and, when assembled on a support, as illustrated in FIG. 1, the lamp filament 2 is forwardly from the support relative to the face 29 so there is no obstruction to light directly downwardly and outwardly of the structure. The flanges 33 are of considerably less cross section than the body providing a flexible yielding shock absorbing portion structure.

In the form of the invention illustrated in FIGS. 8 and 9, the body 66 and contacts 67 respectively are arranged for conductors to extend upwardly through the bottom of the body. The bores or cavities 68 for the wire connector portions 69 of the contacts are substantially cylindrical with an arm extending from the upper bar 70 of the contact and having fingers 71 adjacent the upper portion of the arm for compression into engagement with the wire 72 of a conductor 73 and the lower portion having fingers 74 to engage against the surface defining the bore 68. The body has downwardly extending bosses 75 axially aligned with the bores 68 and said bosses have bores 76 to receive the respective insulated conductors 77. The bores 76 are preferably smaller than the conductors 73 and the end portions 78 of the bosses are conical to form a tight resilient grip on the insulated conductor, providing a seal and engagement tending to prevent the conductor from being pulled therefrom. Except for the change of the wire connector portion 69, the contacts 67 are the same as the contacts 27 illustrated and described relative to the form shown in FIGS. 1 to 7 inclusive, and except for the bosses 75 and bores 76 therethrough for receiving the conductors 77 the body 66 is the same as illustrated and described relative to the form shown in FIGS. 1 to 7 inclusive. The assembly and operation of the mountings are substantially the same except that the conductors are inserted through the openings or bores 76, then connected to the contacts 67 and the contacts assembled in the cavities of the body.

It is to be understood that while we have illustrated and described certain forms of our invention, it is not to be limited to the specific forms or arrangements of parts herein described and shown except insofar as such limitations are included in the claims.

What we claim and desire to secure by Letters Patent is:

1. An electric bulb and socket receptacle assembly comprising, a wedge bases bulb having a base with opposed faces with transverse grooves therein and laterally spaced terminal contacts extending longitudinally on the base and across said grooves, a socket receptacle body member of non-conducting resilient material and elastic throughout, said body member having opposed surfaces, said body member having a cavity therein opening at one surface and terminating in spaced relation to the other opposed surface, said cavity having a transverse shape substantially corresponding to and slightly smaller than that of the bulb base, said wedge base bulb being removably positioned with the base thereof extending into said cavity from the opening thereof and with the opposed faces of said bulb base resiliently engaged for substantially the length thereof by body member portions defining said cavity, and spaced electrical contacts retained in said body member with portions in said cavity engaging opposed faces of the bulb base at said transverse grooves and laterally of the central portion thereof to removably retain the bulb base in the cavity and resiliently supported by said body member, said contact portions engaging the respective terminal contacts of said bulb.

2. An electric bulb and socket receptacle assembly comprising, a wedge base bulb having a base with opposed faces with transverse grooves therein and laterally spaced terminal contacts extending longitudinally on the base and across said grooves, a socket receptacle body member of non-conducting resilient material and elastic throughout, said body member having opposed surfaces, said body member having a cavity therein opening at one surface and terminating in spaced relation to the other opposed surface, said cavity having a transverse shape substantially corresponding to and slightly smaller than that of the bulb base, said wedge base bulb being removably positioned with the base thereof extending into said cavity from the opening thereof and with the opposed faces of said bulb base resiliently engaged for substantially the length thereof by body member portions defining said cavity, spaced electrical contacts retained in said body member with each having substantially U-shaped portions in said body cavity engaging opposed faces of the bulb base at said transverse grooves and laterally of a central portion thereof to removably retain the bulb base in the cavity and resiliently supported by said body member, said U-shaped portions engaging the respective terminal contacts of said bulb, conductor connecting members on each of said spaced contacts in the body member, and conductors extending into said body member from said one surface thereof and electrically connected to said connecting members.

3. An electric socket receptacle to receive and support a wedge base bulb having opposed faces and spaced terminal contacts on the base and opposed grooves extending transversely of said base comprising, an electric contact retaining body member of non-conducting resilient material and elastic throughout, said body member having opposed surfaces, said body member having a cavity of generally elongate cross section opening at one opposed surface and terminating in spaced relation to the other opposed surface, said cavity adjacent the opening corresponding in shape and slightly smaller than the cross section of the bulb base to resiliently engage a bulb base positioned therein, said cavity having an enlarged portion spaced from said one surface and defining an inwardly facing shoulder, spaced contacts in said cavity and each having substantially U-shaped resilient portions engaging opposed faces of the bulb base adjacent to and laterally of a central portion of said base and in contact with the respective terminal contacts of said bulb, rib portions transversely of each U-shaped contact for engaging the transverse grooves in the bulb base for retaining the bulb base in said cavity and resiliently engaged in said body member, means on said U-shaped contact portions engaging the inwardly facing shoulder to removably retain the contacts in the body member, and conductor connecting members on each of said contacts.

4. An electric socket receptacle to receive and support a wedge base bulb having opposed faces and spaced terminal contacts on the base and opposed grooves extending transversely of said base comprising, an electric contact retaining body member of non-conducting resilient material and elastic throughout, said body member having opposed surfaces, said body member having a cavity of generally elongate cross section opening at one opposed surface and terminating in spaced relation to the other opposed surface, said cavity adjacent the opening corresponding in shape and slightly smaller than the cross section of the bulb base to resiliently engage a bulb base positioned therein, a pair of spaced apart cavities each equally spaced in said body member from the first-named cavity, said cavity having an enlarged portion spaced from said one surface and defining an inwardly facing shoulder, spaced contacts in said first-named cavity and each having substantially U-shaped resilient portions engaging opposed faces of the bulb base adjacent to and laterally of a central portion of said base and in contact with the respective terminal contacts of said bulb, rib portions transversely of each U-shaped contact for engaging the transverse grooves in the bulb base for retaining the bulb base in said first-named cavity and resiliently engaged in said body member, means on said U-shaped contact portions engaging the inwardly facing shoulder to removably retain the contacts in the body member, extensions on each of the U-shaped contacts, conductor receiving members on said extensions and positioned in said spaced apart cavities, and mounting flanges integral with said body member and extending therefrom and having less cross section than said body member.

5. An electric socket receptacle to receive and support a wedge base bulb having opposed faces and spaced terminal contacts on the base and opposed grooves extending transversely of said base comprising, an electric contact retaining body member of non-conducting material, said body member having opposed surfaces, said body member having a cavity of generally elongate cross section opening at one opposed surface and terminating in an end in spaced relation to the other opposed surface, said cavity adjacent said opening corresponding in shape and being slightly smaller than the cross section of the bulb base to resiliently engage a bulb base positioned therein, a pair of spaced apart cavities each equally spaced in said body member from the first-named cavity, substantially parallel grooves in said body member and opening from said one surface thereof and extending from the first-named cavity to each of said spaced apart cavities, each of said cavities having enlarged portions spaced from said one surface and defining inwardly facing shoulders, spaced contacts in said first-named cavity and each having a portion engaging said cavity end and having substantially U-shaped resilient portions for engaging opposed faces of the bulb base adjacent to and laterally of a central portion of said base and in contact with the respective terminal contacts of said bulb, rib portions transversely of each U-shaped contact for engaging the transverse grooves in the bulb base for retaining the bulb base in said first-named cavity and resiliently engaged in said body member, means on said U-shaped contact portions engaging the inwardly facing shoulders and cooperating with the engagement of the contact portions with the cavity end to removably retain the contacts in the body member, extensions on each of the U-shaped contacts positioned in said spaced grooves, conductor receiving members on said extensions and positioned in said spaced apart cavities with portions engaging the inwardly facing shoulders therein to cooperate with the means on the contacts for retaining same in the body member, and mounting flanges integral with said body member and extending laterally therefrom and having less cross section than said body member, said body member and flanges constituting an integral structure formed of material such as rubber capable of deforming under stress and capable of automatic restoration to original form, said mounting flanges having a flat surface for engaging a support with said surface inclined relative to a bulb having the bulb base positioned in the first-named cavity.

6. An electric socket receptacle to receive and support wedge base bulbs having a transparent glass envelope surrounding a filament and a glass base portion extending from said envelope, said base having an axial central shaft and opposite laterally extending wings with substantially parallel opposed faces and transverse grooves in said faces extending from said central shaft, said bulb having two terminal wires extending from the filament through the base and turned toward the envelope and lying along faces of the wings and grooves with one wire on one face of one wing and the other wire on the opposite face of the other wing comprising, an electric contact retaining body member of non-conducting resilient material and elastic throughout, said body member having opposed surfaces, said body member having a cavity of generally elongate cross section opening at one opposed surface and terminating in spaced relation to the other opposed surface, said cavity having a transverse cross sectional shape substantially corresponding to the cross sectional shape of the bulb base and slightly smaller whereby the body member portions defining the cavity resiliently engage the faces of the bulb base wings and central shaft, spaced resilient contacts embedded in the body member in said cavity for engaging bulb terminals on a bulb base positioned in said cavity, means in the cavity resiliently engaging the transverse grooves in the bulb base to retain the bulb base therein, said means being spaced from said one surface of the body member whereby the adjacent portion of the envelope is resiliently engaged by the body member at said one surface, and conductor receiving members on each of said spaced contacts.

7. An electric socket receptacle to receive and support wedge base bulbs having a transparent glass envelope surrounding a filament and a glass base portion extending from said envelope, said base having an axial central shaft and opposite laterally extending wings with substantially parallel opposed faces and transverse grooves in said faces extending from said central shaft, said bulb having two terminal wires extending from the filament through the base and turned toward the envelope and lying along faces of the wings and grooves with one wire on one face of one wing and the other wire on the opposite face of the other wing comprising, an electric contact retaining body member of non-conducting resilient material and elastic throughout, said body member having opposed surfaces, said body member having a cavity of generally elongate cross section opening at one opposed surface and terminating in a bottom portion in spaced relation to the other opposed surface, said cavity having a transverse cross sectional shape substantially corresponding to the cross sectional shape of the bulb base and slightly smaller whereby the body member portions defining the cavity resiliently engages the faces of the bulb base wings and central shaft, spaced resilient metal contacts embedded in the body member in said cavity engaging bulb terminals on a bulb base positioned in said cavity, means on said contacts engaging the transverse groove in the bulb base to retain the bulb base therein, said means being spaced from said one surface of the body member whereby the adjacent portion of the envelope is resiliently engaged by the body member at said one surface and the bulb base end remote from said envelope engages the bottom portion of said cavity, a pair of spaced apart cavities each equally spaced in said body member from the first-named cavity and extending substantially parallel thereto, said contacts being substantially U-shaped with spaced leg portions resiliently engaging opposed faces of the wings of the bulb base, an extension on one of the legs of each of said contacts, conductor receiving members on said extensions and positioned in the respective spaced apart cavities, each of said cavities having enlarged portions spaced from said one surface of the body member and defining inwardly facing shoulders, and means on one of the contact leg members and the conductor receiving members engaging said shoulders to retain the contacts in the body member.

8. In a lamp assembly, a housing having a back with a flat inner surface, a lens mounted on said housing to define a chamber therein, a lamp socket in said chamber to receive and support a wedge base bulb having a transparent glass envelope surrounding a filament and a glass base portion extending from said envelope, said base having an axial central shaft and opposite laterally extending wings with substantially parallel opposed faces and transverse grooves in said faces extending from said central shaft, said bulb having two terminal wires extending from the filament through the base and turned toward the envelope and lying along faces of the wings and grooves with one wire on one face of one wing and the other wire on the opposite face of the other wing, said lamp socket having an electric contact retaining body member of non-conducting resilient material and elastic throughout, said body member having opposed surfaces, said body member having a cavity of generally elongate cross section opening at one opposed surface and terminating in a bottom portion in spaced relation to the other opposed surface, said cavity having a transverse cross sectional shape substantially corresponding to the cross sectional shape of the bulb base and slightly smaller whereby the body member portions defining the cavity resiliently engage the faces of the bulb base wings and central shaft, spaced resilient metal contacts embedded in the body member in said cavity engaging bulb terminals on a bulb base positioned in said cavity, means on said contacts engaging the transverse groove in the bulb base to retain the bulb base therein, said means being spaced from said one surface of the body member whereby the adjacent portion of the envelope is resiliently engaged by the body member at said one surface and the bulb base end remote from said envelope engages the bottom portion of said cavity, a pair of spaced apart cavities each equally spaced in said body member from the first-named cavity and extending substantially parallel thereto, said contacts being substantially U-shaped with spaced leg portions resiliently engaging opposed faces of the wings of the bulb base, an extension on one of the legs of each of said contacts, conductor receiving members on said extensions and positioned in the respective spaced apart cavities, each of said cavities having enlarged portions spaced from said one surface of the body member and defining inwardly facing shoulders, means on one of the contact leg members and the conductor receiving members engaging said shoulders to retain the contacts in the body member, laterally extending flanges integral with said body member, and means securing said flanges relative to said housing to support said body member in said chamber.

References Cited in the file of this patent

UNITED STATES PATENTS

| | | |
|---|---|---|
| 2,059,077 | Alden | Oct. 27, 1936 |
| 2,099,444 | Langdon | Nov. 16, 1937 |
| 2,490,576 | Bower et al. | Dec. 6, 1949 |
| 2,563,775 | Del Camp | Aug. 7, 1951 |
| 2,633,483 | Hafke | Mar. 31, 1953 |
| 2,686,868 | Diedring | Aug. 17, 1954 |
| 3,005,089 | Robbins | Oct. 17, 1961 |

FOREIGN PATENTS

| | | |
|---|---|---|
| 824,158 | Great Britain | Nov. 25, 1959 |

OTHER REFERENCES

Germany application 1,110,009, printed June 29, 1961.